United States Patent
Porter et al.

(10) Patent No.: US 11,741,251 B2
(45) Date of Patent: *Aug. 29, 2023

(54) SYSTEM OF ENCLAVES

(71) Applicant: Google LLC, Mountain View, CA (US)

(72) Inventors: Nelly Porter, Kirkland, WA (US); David Benson Cross, Redmond, WA (US); Uday Ramesh Savagaonkar, Redmond, WA (US); Brandon S. Baker, Redmond, WA (US); Sergey Simakov, Redmond, WA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/699,554

(22) Filed: Mar. 21, 2022

(65) Prior Publication Data

US 2022/0215112 A1 Jul. 7, 2022

Related U.S. Application Data

(60) Continuation of application No. 16/990,003, filed on Aug. 11, 2020, now Pat. No. 11,314,882, which is a (Continued)

(51) Int. Cl.
*G06F 21/62* (2013.01)
*H04L 9/40* (2022.01)
(Continued)

(52) U.S. Cl.
CPC ...... *G06F 21/6218* (2013.01); *G06F 21/6245* (2013.01); *G06F 21/64* (2013.01); *G06F 21/70* (2013.01); *H04L 63/08* (2013.01); *H04L 63/126* (2013.01); *H04L 67/10* (2013.01); *G06F 2221/2105* (2013.01)

(58) Field of Classification Search
CPC .. G06F 21/6218; G06F 21/6245; G06F 21/64; G06F 21/70; G06F 21/53; G06F 2221/2105; G06F 9/455; G06F 9/5072; H04L 63/08; H04L 63/126;
(Continued)

(56) References Cited

U.S. PATENT DOCUMENTS 9,165,120 B1 10/2015 Brandwine
9,442,752 B1 9/2016 Roth et al.
(Continued)

FOREIGN PATENT DOCUMENTS

CN 101599025 A 12/2009
CN 102123158 A 7/2011
(Continued)

OTHER PUBLICATIONS

Rethinking Computers for Cybersecurity, Ruby B. Lee, published Apr. 2015 (Year: 2015).*

(Continued)

*Primary Examiner* — Vu V Tran
(74) *Attorney, Agent, or Firm* — Lerner David LLP

(57) ABSTRACT

Methods, systems, and apparatus, including computer programs encoded on a computer storage medium, for instantiating and managing systems that utilize hierarchal enclaves in a cloud environment.

16 Claims, 6 Drawing Sheets

Related U.S. Application Data division of application No. 15/812,875, filed on Nov. 14, 2017, now Pat. No. 10,776,503.

(60) Provisional application No. 62/421,905, filed on Nov. 14, 2016.

(51) Int. Cl.

| | | |
|---|---|---|
| H04L 9/08 | (2006.01) | |
| H04L 9/32 | (2006.01) | |
| G06F 9/455 | (2018.01) | |
| G06F 9/50 | (2006.01) | |
| G06F 21/53 | (2013.01) | |
| G06F 21/70 | (2013.01) | |
| G06F 21/64 | (2013.01) | |
| H04L 67/10 | (2022.01) | |

(58) Field of Classification Search
CPC . H04L 63/0428; H04L 63/0869; H04L 67/10; H04L 9/0861; H04L 9/3247
See application file for complete search history.

(56) References Cited

U.S. PATENT DOCUMENTS

| | | | |
|---|---|---|---|
| 9,489,534 | B2 | 11/2016 | Hashii et al. |
| 10,061,915 | B1* | 8/2018 | Roth ............... G06F 21/50 |
| 2010/0037055 | A1 | 2/2010 | Fazio |
| 2012/0159184 | A1 | 6/2012 | Johnson et al. |
| 2012/0266156 | A1 | 10/2012 | Spivak |
| 2014/0281531 | A1 | 9/2014 | Phegade et al. |
| 2015/0278528 | A1 | 10/2015 | Xing et al. |
| 2016/0171248 | A1* | 6/2016 | Nesher ............ G06F 21/53 713/190 |
| 2016/0246720 | A1* | 8/2016 | Pandey ............ G06F 12/14 |
| 2016/0283404 | A1* | 9/2016 | Xing ............... G06F 3/0632 |
| 2016/0283409 | A1 | 9/2016 | Pandey et al. |
| 2017/0372076 | A1 | 12/2017 | Poomachandran et al. |

FOREIGN PATENT DOCUMENTS

| | | |
|---|---|---|
| CN | 102473224 A | 5/2012 |
| CN | 104991526 A | 10/2015 |
| CN | 105101169 A | 11/2015 |
| CN | 105488679 A | 4/2016 |
| CN | 105745661 A | 7/2016 |
| WO | 2011152910 A1 | 12/2011 |

OTHER PUBLICATIONS

Extended European Search Report for European Patent Application No. 22181049.2 dated Nov. 16, 2022. 9 pages.
Notification of the First Office Action for Chinese Patent Application No. 201711124007.4 dated Apr. 8, 2020. 8 pages.
Notification of the Second Office Action for Chinese Patent Application No. 201711124007.4 dated Oct. 13, 2020. 5 pages.
Notice of Allowance for Chinese Patent Application No. 201711124007.4 dated Mar. 3, 2021. 4 pages.
Office Action for European Patent Application No. 17805085.2 dated Mar. 25, 2021. 5 pages.
'blogs.gartner.com' [online] "IT Glossary: Cloud Access Security Brokers (CASBs)," Available on or before Mar. 22, 2016, [retrieved on Jan. 30, 2018]Retrieved from Internet: URL<https://blogs.gartner.com/it-glossary/cloud-access-security-broker- s-casbs/> via the Wayback InternetArchive at URL< https://web.archive.org/web/20150322085326/ https://blogs.gartner.com/it-g-lossary/cloud-access-security-brokers-casbs/> 3 pages.
'software.intel.com' [online] "Intel Software Guard Extensions (Intel SGX)" available on or before Jan. 19, 2016, [retrieved on Jan. 30, 2018] Retrieved from Internet: URL<https://software.intel.com/en-us/sgx> via the Wayback Internet Archiveat URL< https://web.archive.org/web/20180119230057/https//software.intel.com/en- us/sgx> 5 pages.
'www.cio.com' [online] "Is BYOK the key to secure cloud computing?," Mary Branscombe, Sep. 28, 2015, [retrieved on Jan. 30, 2018] Retrieved from Internet: URL<https://www.cio.com/article/2986308/cloud-security/is-by-ok-the-key-to-secure-cloud-computing.html> 5 pages.
'www.globalplatform.org' [online] "Global Platform Specifications," Available on or before Sep. 13, 2008, [retrieved Jan. 30, 2018] Retrieved from Internet: URL<https://www.globalplatform.org/specificationsdevice.asp> via the Wayback InternetArchive at URL< https://web.archive.org/web/20080913021156/https://www.globalplatform.org-/specificationsdevice.asp> 3 pages.
Anati et al. "Innovative Technology for CPU Based Attestation and Sealing," Proceedings of the 2.sup.nd International Workshop on Hardware and Architectural Support for Security and Privacy, col. 13, Aug. 14, 2013, 6 pages.
Dara et al. "Cryptography Challenges for Computational Privacy in Public Clouds," IEEE International Conference on Cloud Computing in Emerging Markets, Oct. 16, 2013, 5 pages.
International Search Report and Written Opinion issued in International Application No. PCT/US2017/061561, dated Jan. 23, 2018, 15 pages.
Zhang et al. "CloudVisor," Operating Systems Principles, ACM, Oct. 23, 2011, 14 pages.
Kanzari et al. "Towards Managements of Chains of Trust for Multi-Clouds with Intel SGx," Second Workshop on Security in clouds, Jul. 5, 2016, 4 pages.
Schuster et al. "VC3: Trustworthy Data Analysitcs in the Cloud using SGX," IEEE Symposium on Security and Privacy, May 21, 2015, 17 pages.
Singaporean Search and Exam Report issued in Singaporean Application No. 10201709367U, dated May 15, 2018, 8 pages.
Singapore Office Action in Singapore Appln. No. 10201709367U, dated Mar. 21, 2019, 28 pages.
Irish Search Report and Written Opinion issued in Irish Application No. 2017/0239, dated Apr. 12, 2018, 6 pages.
Great Britain Examination and Search Report issued in British Application No. GB1718728.7, dated Feb. 28, 2018, 8 pages.
Singapore Examination Report in Singapore Application. No. 10201709367, dated Aug. 22, 2019, 4 pages.
First Examination Report for Indian Patent Application No. 201947022856 dated Jul. 14, 2021. 6 pages.
Office Action for European Patent Application No. 17805085.2 dated Sep. 21, 2021. 4 pages.
Office Action for German Patent Application No. 102017126706.9 dated Feb. 7, 2022. 12 pages.

\* cited by examiner

SYSTEM OF ENCLAVES

CLAIM OF PRIORITY

The present application is a continuation of U.S. patent application Ser. No. 16/990,003, filed on Aug. 11, 2020, which is a divisional of U.S. patent application Ser. No. 15/812,875, filed on Nov. 14, 2017 (now U.S. Pat. No. 10,776,503, issued on Sep. 15, 2020), which claims priority under 35 U.S.C. § 119(e) to U.S. Patent Application No. 62/421,905, filed on Nov. 14, 2016, all of which are hereby incorporated by reference.

BACKGROUND

This specification relates to storage and processing of data in cloud environments.

Cloud computing is network-based computing in which typically large collections of servers housed in data centers or "server farms" provide computational resources and data storage as needed to remote end users. To adopt the public cloud, customers must be willing to entrust their sensitive data and applications to cloud providers. To be able to make this decision, customers have to be convinced that their data and execution is safe; that they are protected from all type of attackers and are ultimately in control of their applications and data. Trust is thus one of the core enablers of cloud adoption but also an important consideration for adoption.

Traditionally, the trusted execution environments were created to support stand-alone computers and mobile devices to provide secure execution in the isolated trusted firmware based environments. However, these strategies are inadequate for the increased flexibility of the distributed computing and, in particular, do not meet the goals and scale of the public cloud.

SUMMARY

In general, one innovative aspect of the subject matter described in this specification can be embodied in methods that include the actions of launching a root enclave; accessing an enclave manifest by the root enclave, wherein the enclave manifest specifies, for each of a plurality of component enclaves, a particular role for the respective component enclave; and instantiating each of the component enclaves, each component enclave configured to perform its respective role; wherein the root enclave and component enclaves form an enclave pod. Other embodiments of this aspect include corresponding systems, apparatus, and computer programs, configured to perform the actions of the methods, encoded on computer storage devices.

A second innovative aspect of the subject matter described in this specification can be embodied in methods that include the actions of launching a first root enclave and first component enclaves according to a first manifest; launching a second root enclave and second component enclaves according to a second manifest; providing first data to the first component enclaves; providing second data that is different from the first data to the second component enclaves. Other embodiments of this aspect include corresponding systems, apparatus, and computer programs, configured to perform the actions of the methods, encoded on computer storage devices.

In other words, this second innovative aspect can be embodied in methods that include the actions of launching a first root enclave; accessing a first enclave manifest by the first root enclave, wherein the first enclave manifest specifies, for each of a plurality of first component enclaves, a particular role for the respective first component enclave; instantiating each of the first component enclaves, each first component enclave configured to perform its respective role; wherein the first root enclave and first component enclaves form a first enclave pod; providing first data to the first component enclaves; launching a second root enclave; accessing a second enclave manifest by the second root enclave, wherein the second enclave manifest specifies, for each of a plurality of second component enclaves, a particular role for the respective second component enclave; instantiating each of the second component enclaves, each second component enclave configured to perform its respective role; wherein the second root enclave and second component enclaves form a second enclave pod; and providing second data to the second component enclaves, wherein the second data is different from the first data.

Another innovative aspect of the subject matter described in this specification can be embodied in methods that include the actions of receiving, from a plurality of enclave participants, a key fragment; constructing, from the key fragments, a master key for a rendezvous enclave; launching the rendezvous enclave using the master key; and executing, in the rendezvous enclave, data from the plurality of enclave participants. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. A scalable and dynamic network of trusted execution environments addresses multiple use cases that involve customers' secrets and a growing demand to protect customers' data and code that are executed in the cloud. The network of trusted execution environments, called enclaves, can cryptographically prove to their parent root and to third party verifiers that they provide confidentiality and integrity. Running sensitive small execution tasks in the enclaves provides an additional level of protection, resiliency and high availability, and ensures that critical decisions cannot be reverted by untrusted code or root-privileged adversary.

For rendezvous enclaves, the binding code and data to the distributed system of enclaves connected to the enclave that the customer controls reduce the complexity that would be required for explicit key management challenges for a set of trusted execution environments.

For hybrid enclaves, multiple use cases that involve customers' secrets and the growing demand to protect customers' data and code that shared with the cloud providers are met by the introduction of a scalable set of the trusted execution environments that can be used as a rendezvous place for untrusted multiple parties. The enclave can cryptographically prove to their multiparty participants that they provide confidentiality and integrity. Running sensitive execution tasks in the enclaves will provide an additional level of protection, resiliency, and high availability, to ensure that sensitive data and code cannot be accessed or exfiltrated by untrusted code or even by cloud high privileged insiders.

The enclaves can also facilitate the production of cryptographically signed or tamper evident logs detailing all actions and transactions. These logs can be provided or used as historical records or forensics.

The details of one or more embodiments of the subject matter described in this specification are set forth in the accompanying drawings and the description below. Other

BRIEF DESCRIPTION OF THE DRAWINGS

Like reference numbers and designations in the various drawings indicate like elements.

DETAILED DESCRIPTION

Overview

Figure 1:
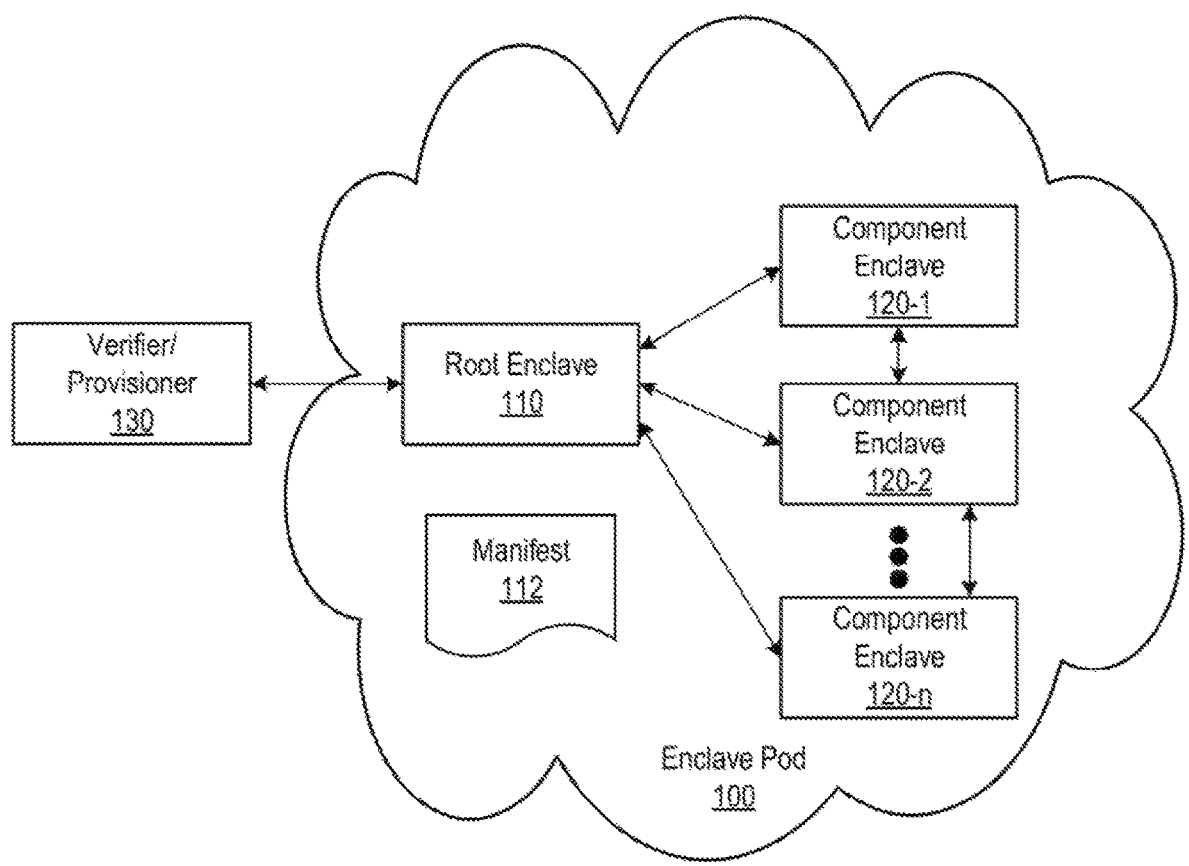
FIG. 1 is a system diagram of an enclave pod.

An enclave pod is an isolated and secure execution environment in which customers may run their sensitive application payloads. Code and data that crosses the enclave boundary is encrypted. The enclave pod facilitates a chain of trust, enabled in hardware and/or software, that provides public interfaces to enable popular use cases like Certificate Authority hosting to issue Certificate Signing responses to the callers, or performing sensitive verification decisions on behalf of authentication or authorization systems, with the goal to ensure that the operation and decision that are made in the isolated secure execution environments cannot be altered or removed by unauthorized entities. The enclave pod thus enables confidentiality and integrity protection for customers' code and data running in the cloud against unwarranted disclosure and modifications.

In some implementations, an enclave pod assures confidentiality and integrity of code and data when the code and data is at rest, before it enters and after it leaves boundaries of the enclaves. The integrity of the enclaves can be remotely verified, as can the code and data that runs within the enclaves. Moreover, workloads can be distributed geographically over multiple regions or zones to ensure high availability and performance of their services, or due to data provenance requirements.

Because a set of enclaves communicating as peers or running trusted execution environments in respective stand-alone mode will not satisfy the complex use cases cloud providers need to address, an enclave pod employs a hierarchical model of trust between enclaves.

An enclave pod divides computationally sensitive task to multiple related subtasks and runs them in the set of trusted enclaves. For example, an enclave pod can perform multiple tasks expected from a Certificate Authority, such as authentication of a caller, validation of a request, issuance of the nonce/timestamp, etc., as a set of different children enclaves the descending from a root enclave. Similarly, for genomic research, even more complicated sets of operations can be executed by utilizing the hierarchical nature of enclaves in an enclave pod.

The root enclave can attest and verify the trust relationship between the children to be able to delegate work to them. The root enclave can also delegate the ability to establish the trust, and attest and verify their proofs to children enclaves to ensure that the system can scale and meet the demand of various use cases.

In some implementations, the execution of the sensitive and high-top secret tasks can be delegated to geographically distributed clusters and spawn across multiple geographic locations and regions to perform customer's' sensitive tasks within sub-enclaves hosted on these locations and orchestrated by a master enclave.

The enclave pods also enable user applications to create execution units that are protected from system software and, depending upon enclave technology being used, hardware attacks. The pod enclave architecture allows an enclave to prove its identity to a local or a remote verifier, obtain/generate secrets, and seal those secrets to its own identity. The enclave pod extends basic enclave attestation and sealing infrastructure to support system-level attestation and sealing. The hierarchal enclave pod is described with reference to FIGS. 1 and 2 below.

In additional implementations, the enclave pods may be cooperatively distributed in a hybrid cloud, where a master enclave pod is operating on-premise of a customer or in a private cloud, and additional enclave pods are operating in the public cloud. Hybrid cloud enclaves are described with reference to FIGS. 3 and 4 below.

In still further implementations, an enclave pod may be configured to enable sharing of sensitive data from multiple parties for the performance of common tasks. Access to the sensitive data by the multiple parties, however, is precluded. Such an enclave pods is referred to as a rendezvous enclave, and is described with reference to FIGS. 5 and 6 below.

Hierarchal Enclave Pod

FIG. 1 is a system diagram of an enclave pod 100. The enclave pod 100 is a manifest-based hierarchical aggregation of enclaves that define a system. The enclave pod 100 seals secrets (i.e., sensitive code, sensitive binaries, sensitive data, or any other data, instructions, code or information that a party deems sensitive or does not desire to disclose publicly) to a system description as well as an individual enclave identity. In operation, a secret is only accessible to an enclave in the enclave pod 100 if the enclave is a part of an enclave pod 100 and built according to a manifest, and only if the identified enclave in the enclave pod 100 is designated to have access to the secret.

The enclave pod 100 includes a root enclave 110, a manifest 112, and two or more component enclaves 120. Each component enclave in the pod 100 may have a unique role, e.g., is assigned a particular task or process to perform.

The manifest 112 describes the enclave pod 100. The manifest 112 lists the various roles in the pod 100, and the identities of the enclaves 120 corresponding to each role. In some implementations, the manifest allows only one identity per role, and a role may not be assigned to two separate component enclaves. The manifest 112 is signed by a system builder, and has a purpose and version, which are described in more detail below. A manifest-verification key coupled with the manifest purpose and version define the identity of the manifest.

The root enclave 110 is responsible for verifying component enclaves and ensuring that their roles/identities match those listed in the manifest 112. In other words, the root enclave 110 is responsible for enforcing the manifest 112.

The component enclaves 120 communicate with each other over mutually authenticated and encrypted channels. The component enclaves 120 communicate with the root enclave 110 over unidirectionally authenticated and encrypted channel. The root-to-component channel is unidirectionally authenticated because only the root enclave 110 verifies the component enclave 120 against the manifest 112. Verification can be done by any appropriate security verification process.

The component enclaves 120, in some implementations, do not verify the root enclave 110. In some implementations, the component enclaves 120 are agnostic to the manifest 112 itself, and they "blindly" rely on the root enclave 110 to enforce the manifest 112.

The enclaves 110 and 120 can be instantiated by any appropriate enclave instantiation process. Once the pod of enclaves is established, the root enclave 110 can communicate with a remote verifier/secret provisioner 130 to obtain the secrets, e.g., binaries and data, for provisioning. The remote verifier 130 verifies the root enclave 110, which then asserts the identity of the manifest 112 it is enforcing. If the verifier 130 determines the identity of the root enclave 110 and that of the manifest 112 the root enclave 110 it is enforcing is acceptable, the verifier 130 provisions the necessary secrets. The individual components of the enclave pod 100 can also generate additional secrets. In some implementations, the generated and provisioned secrets can be sealed to the manifest 112 and the component enclave identity.

Each component enclave 120 in a pod 100 has one role. A role is the meta-functionality implemented by the enclave 120, and is an arbitrary string. Each component enclave 120 knows its own role, and knows roles of other component enclaves 120 it communicates with. Component enclaves 120, in some implementations, do not know, nor are they required to know, the identities of the other component enclaves 120. The role-to-identity mapping is provided by the manifest 112, and is enforced by the root enclave 112. Thus, when a component enclave 120 needs to communicate with another component enclave, the determination of which enclave to communicate with is role dependent.

The manifest 112 has three main purposes. First, the manifest 112 describe the enclave pod 100 to the remote verifier 130. Second, the manifest 112 allows component enclaves 120 to communicate with each other based on their roles rather than their identities. Finally, the manifest 112 allows component enclaves 120 to seal secrets to the pod configuration, in addition to sealing them to their own identity.

The manifest 112 is signed by the system builder. The manifest signature itself is stored separately from the manifest 112. The manifest signature may be derived, for example, from data in the manifest, such as the version, the size, a signature header, and any other data suitable for signature generation.

Figure 2:
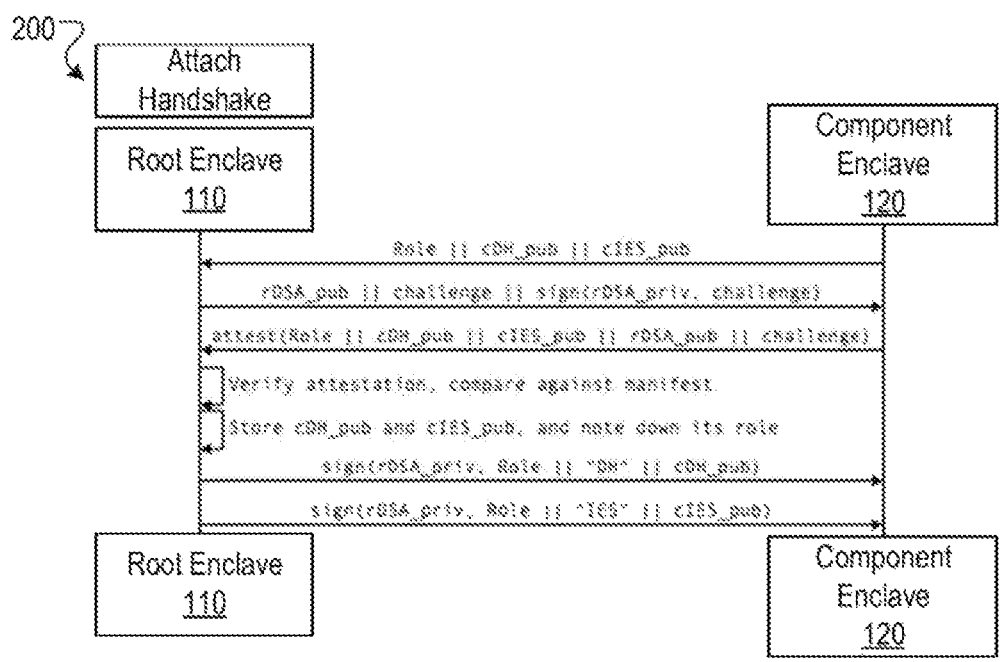
FIG. 2 is a timing diagram of an inter-enclave communication.

FIG. 2 is a timing diagram 200 of an inter-enclave communication. The timing diagram provides one example process for managing communications so that confidentiality and integrity are protected. Particular key-pair types are referred to below, but other key types may also be used. Likewise, other secure communication techniques and processes can also be used, however.

The communication channels between the component enclaves 120 are bi-directionally authenticated, while those between the root enclave 110 and a component enclave 120 are unidirectionally authenticated. This is achieved through an attach handshake. Each member of the enclave pod should have the possession of an ECDH key pair (see below) certified by the root enclave 110 ECDSA key (see below) to be able to securely communicate between each other. Additionally, each member of the enclave POD ensures that the peer's ECDH key is also certified by the same ECDSA key to be able to share any information.

According to the process of FIG. 2, the root enclave 110 is launched first. In this particular example, the root enclave 110 generates two key-pairs for itself—rDSA and rDH. The rDSA is an Elliptic Curve Digital Signature Algorithm (ECDSA) key-pair, whereas rDH is an Elliptic Curve Diffie-Hellman (ECDH) key pair. The Root enclave 110 then signs rDH_pub as a channel-establishment key for the role "ROOT."

The component enclaves 120 are then launched. As the component enclaves 120 are launched, they go through an attach process that enables them to get their own channel-establishment and provisioning credentials. The attachment process works as follows. Each of the component enclaves 120 generates two key-pairs—cDH and cIES. The cDH is an ECDH key-pair that is used for inter-enclave channel establishment, which cIES is an Elliptic Curve Integrated Encryption Scheme (ECIES) key-pair that can be used by others to provision secrets to the enclave pod 100.

The component enclave 120 then initiates the attach handshake with the root enclave 110, and the attach handshake is performed according to the timing diagram of FIG. 2. As depicted in FIG. 2, the component enclave 120 sends to the root enclave 110 its manifest with the role ("Role"), its own component ECDH public key (cDH-pub) and ECIES public key (cIES_Pub).

The root enclave 110, after receiving this request, issuing a challenge, and sends a packet to the component enclave 120 that initiated attach process. The packet includes the root's own Root ECDH public key (rDSA_pub), a challenge, and combination of ECDSA public key and the challenge, signed by the root enclave 110 ECDSA private key (rDSA_priv).

The component enclave 120 obtains the package, validates the signature with the root public ECDSA key that is part of the package, and sends back the attestation statement that includes: the component enclave 120 role as stated in the manifest; the component enclave 120 component ECDH public key (cDH_pub); the component enclave 120 component ECIES public key (cIES_pub); the root enclave ECDSA public key received in the previous step (rDSA_pub); and the challenge received in the previous step. The package is signed with the component enclave 120 ECIES private key and includes an attestation statement that will include the integrity measurement that describes the state of the component enclave 120.

The root enclave 110 obtains the package, validates the signature with the component enclave 110 public ECIES key, verifies the attestation statement, and verifies the role against a known component manifest. After completion, the root enclave 110 stores the component enclave 120 public ECDH key (cDH_pub) and ECIES key (cIES_pub) together with the component enclave 120 role in the POD manifest.

As a result of "attachment process" completion the root enclave 110 then issues two statements. The first is a signed statement that may include: the component enclave 120 role; the type of the certified key "DH"; and the component enclave 120 ECDH public key cDH_pub. The statement is signed with the root enclave's 110 own rDSA Root enclave ECDSA private key. The second signed statement may include: the component enclave 120 role; the type of the certified key "IES"; and component enclave's 120 ECIES public key cIES_pub. The statement is signed with the root enclave's 110 own rDSA Root enclave ECDSA private key.

The, at the end of the attach handshake, each component enclave has an ECDH key-pair and an EC-IES key-pair that is certified by the ECDSA key of the root enclave. Thereafter, any two enclaves in the pod 100 can establish a secure connection using these certified ECDH keys. Each of the enclaves ensures that the peer's ECDH key is certified by the same ECDSA key.

Once the pod 100 is established through the attach process, the remote verifier 130 can provision secrets into this system. To minimize the exposure of the provisioned secrets, the remote verifier 130 wraps such secrets with cIES_pub key of individual component enclaves 120. The root enclave 110 is within the trust boundary of such provisioned secrets, as it is the one that certifies the cIES_pub keys. Thus, the purpose of such wrapping is only to prevent inadvertent disclosure of these secrets.

Finally, each of the component enclaves 120 is responsible for sealing its own secrets. Each component enclave 120 does this by mixing its own sealing key with a role-and-manifest-specific key provided by the root enclave 110. The role-and-manifest-specific key is generated by mixing root enclave's 110 sealing key with the role and the manifest identity.

In some implementations, the enclave pod 100 can produce secure logs based on all transactions or actions performed in the enclave. The logs are cryptographically signed with the key of the enclave.

While the description of FIG. 2 above specifically concerns the use of elliptic curve cryptography by the use of the ECDH key pair and the ECDSA key, this is not essential to the invention, and other types of cryptographic keys may be used.

Hybrid Cloud Enclaves

With a private cloud, the customer controls their on-premises environment and has existing workloads running within the on-premises environment. However, the public cloud may be more scalable and performant. Thus, hybrid cloud enclaves enable the customer to take advantage of the scalability of the public cloud while still offering the protection of on-premises environment for certain data and binaries.

When a customer is running hybrid cloud deployment, the customer may desire to protect their sensitive code or data from the public cloud provider. To accomplish this goal, the hybrid cloud allows customer to bind their secrets to the components they have full control over in their on-premises environment. This mechanism enables the customer to leverage the power of public cloud for other, less sensitive, code and data while keeping control of high-value data and code by running it locally. Likewise, the cloud provider may want to offload some sensitive tasks to run on the customer's data center or other cloud to comply with the regulations or offer customers more flexibilities, while still maintaining the trusted relationship with outsourced functionality by virtue of linking it to the customer's workloads that continue to reside in the public cloud.

Figure 3:
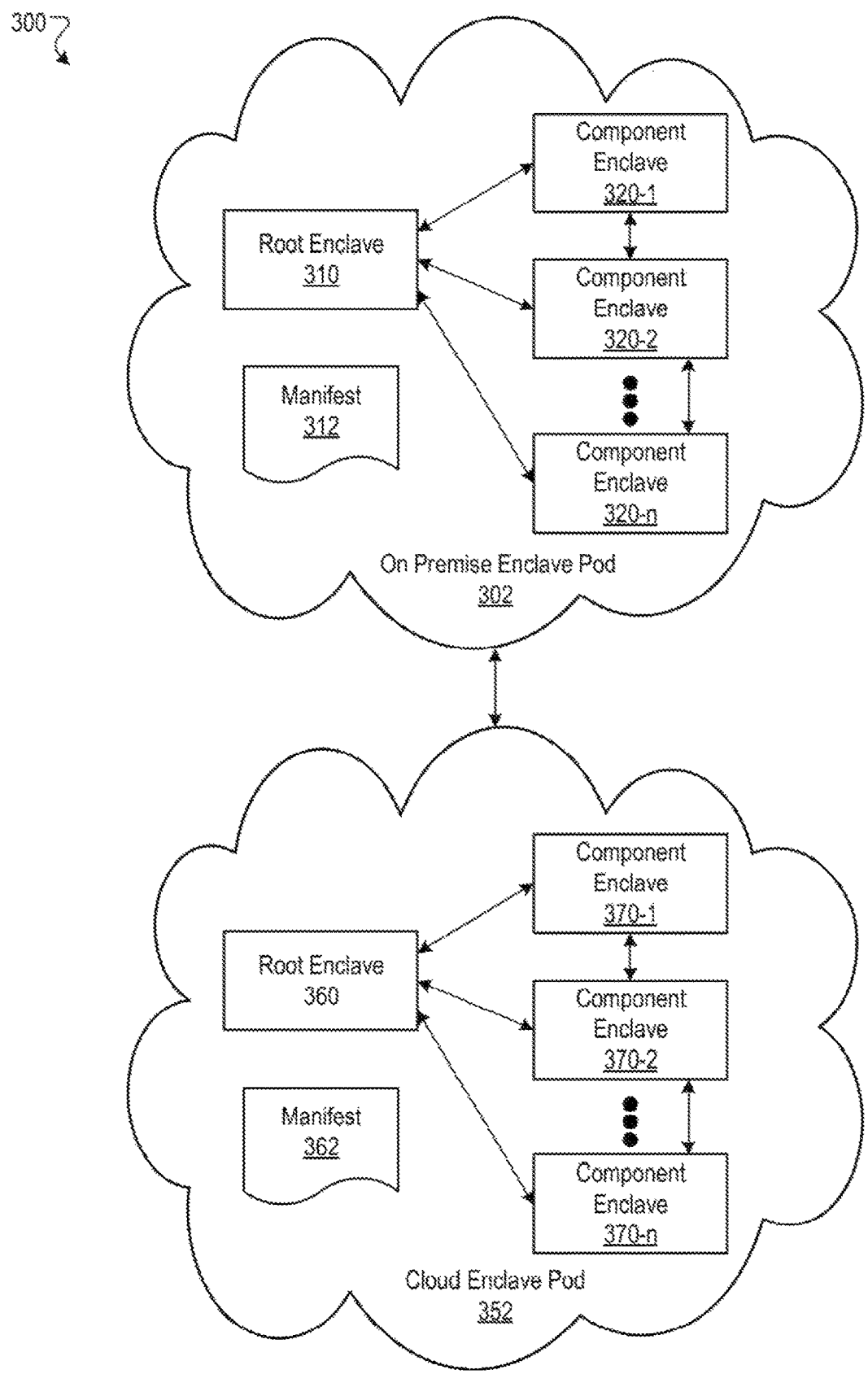
FIG. 3 is a system diagram of multiple enclaves in a hybrid cloud.

FIG. 3 is a system diagram of multiple enclaves in a hybrid could. A hybrid cloud enclave 300 binds most sensitive code (relative to less sensitive code) and data to the isolated secure execution environment in an on-premise enclave pod 302 that is operated under the customer's control. The on-premise enclave pod 302 leverages the system of enclaves to enable strict isolation of the sensitive code execution or access to the sensitive data as specified by a customer, and less sensitive code and are processed in one or more cloud enclave pods 352. The pods 302 (root enclave 310, manifest 312, and component enclaves 320) and 352 (root enclave 360, manifest 362, and component enclaves 370) are similar in the hierarchical architecture described with reference to the pod 100 of FIG. 1.

The binding to the on-premise enclave pod 302 automatically enforces encryption whenever code or data leave the security boundary of the customer's enclaves. The on-premise enclave pod 302 also enables a customer to attest the enclaves, and overall gives the customer assurance that their sensitive code and data are processed on their terms, thus addressing the main risks that customers see in using a multi-tenant public cloud for their sensitive workloads.

Figure 4:
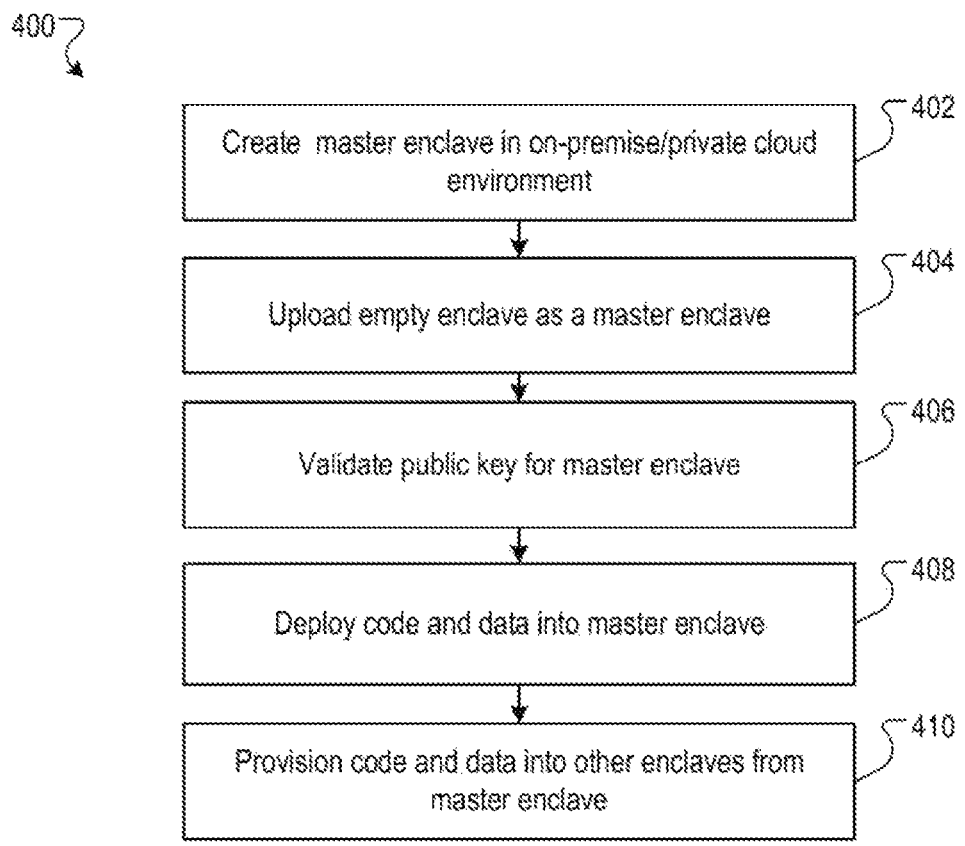
FIG. 4 is a flow diagram of an example process for generating multiple enclaves in a hybrid cloud.

FIG. 4 is a flow diagram of an example process for generating multiple enclaves in a hybrid cloud. The process 400 creates a master enclave in on-premise/private cloud environment (402). For example, a customer creates their master enclave, in empty form (without code or data) using a provided toolkit in on-premises/private cloud environment under their full control. The customer signs the master enclave its own private key and adds its public key to the package of the master enclave. The customer then activates an enclave management service from a public cloud provider, selects the task to provision for a cloud enclave pod, and specifies how the enclaves in the cloud are to be managed.

The process 400 uploads the empty enclave as a master enclave (404). The master enclave is uploaded to the cloud service. The master enclave, once instantiated, enables other cloud enclaves to validate the proof of possession of a key that a master enclave is signed with using a public key that is shared as part of the same transaction.

The process 400 validate public key for master enclave (406). The public key, which was shared offline (e.g., through another secure channel) with the cloud provider, is validated as well to ensure that a verifiable customer account is used to create the enclave pod.

The process 400 deploys code and data into master enclave (408). For example, the customer deploys the code and data into their master enclave on premise and validates functionality.

The process 400 provisions code and data into other enclaves from master enclave (410). For example, as the customer's enclave joins the system of enclaves in the cloud, code and data are deployed via the mater enclave to all other enclaves in the system as specified by the customer (regions, hierarchical relationship, availability, etc.) As each new enclave in a pod is instantiated, it has to attest its' origin and state to existing members of the pod based on the enclave's attestation flows. A customer can then interact with its system of enclaves to execute sensitive code or process sensitive data without separately managing encryption and complicated key management. The customer has assurance that their sensitive code and data are protected in the public cloud while in use, and confidentiality and integrity are enforced while at rest.

A customer can periodically run attestation of enclaves used in their system and the code that executes in their enclaves to validate the integrity of the code and data that run in the enclaves.

Rendezvous Enclave

A rendezvous enclave enables the processing of data and code by multiple untrusted parties while ensuring that each party does not achieve access to data or code of other parties. This enables collaborative processing among parties with assurances of data integrity, security and confidentiality.

The rendezvous enclave provides customers with the option to run their private application payloads in the isolated secure execution environments where untrusted parties can safely share their data and perform their common tasks that benefit all participants. The rendezvous enclave also supports and maintains a chain of trust, rooted in hardware and/or software, and offers cryptographic attestation, verifiable by multiple parties, to ensure confidentiality and integrity of the tasks performed in the enclave.

In some implementations, a rendezvous enclave allows for the splitting and reconstruction of cryptographic keys in the enclave environment. The keys are escrowed by the set of untrusted parties to ensure that high impact authorization decision is performed with all parties' supervision and agreement, when offering their parts of the "key" to authorize the operation. This scheme is applicable to the cloud providers when other parties then cloud providers themselves are operating their facilities, and becoming the facility and data guardian entity. Similar approaches extend to not only cryptographic operations, but for the arbitrary type of operations, where untrusted multi-party can enforce an access control that required consent from all or subset of the parties. The rendezvous enclave thus ensures private operations and decisions that are made in the isolated secure execution environment cannot be altered, and personal sensitive data cannot be accessed or exfiltrated from the enclave.

Figure 5:
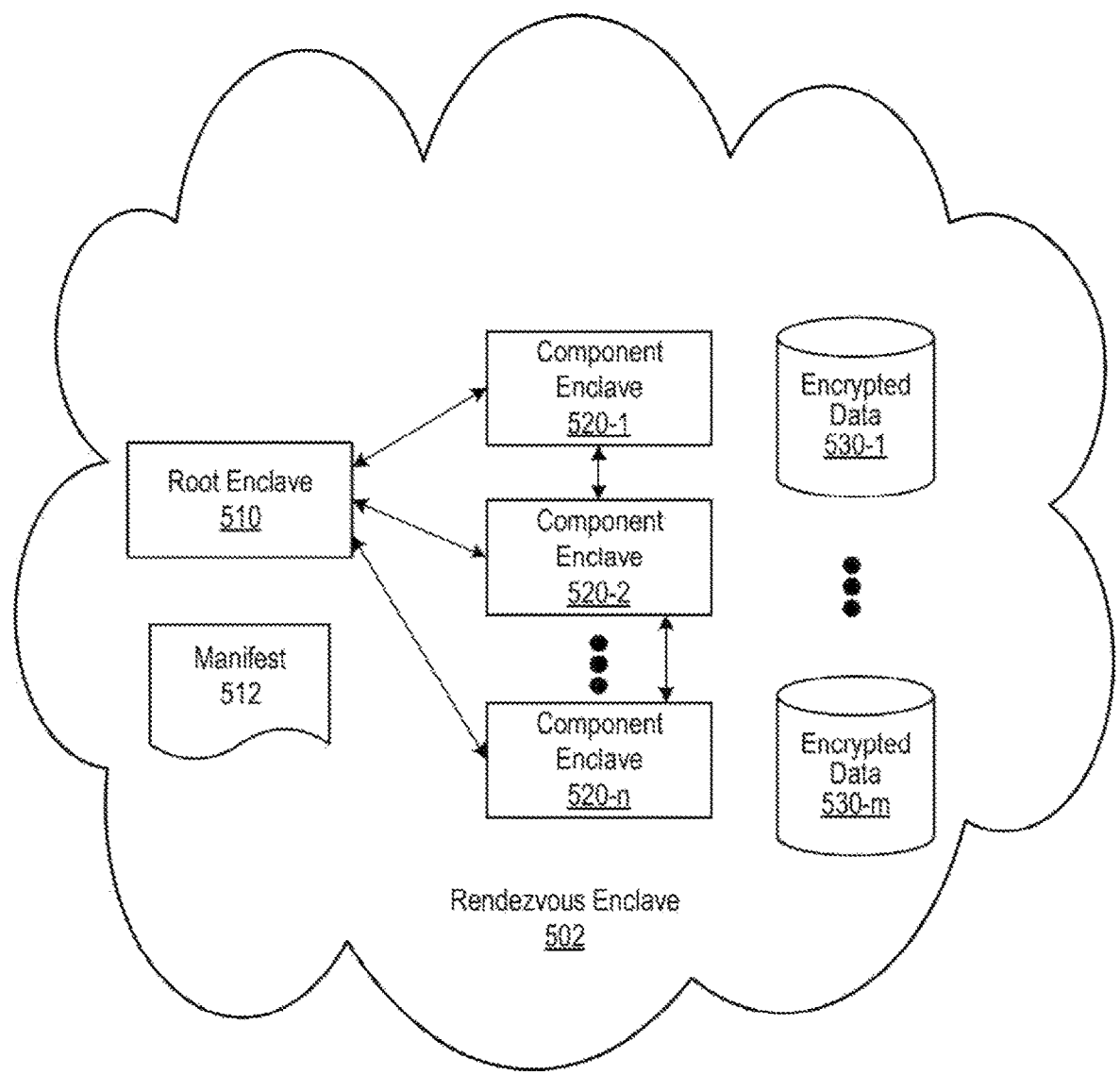
FIG. 5 is a system diagram of a rendezvous enclave for multiple parties.

FIG. 5 is a system diagram of a rendezvous enclave 502 for multiple parties. The enclave 502 (root enclave 510, manifest 512, and component enclaves 520) is similar in the hierarchical architecture described with reference to the pod 100 of FIG. 1. However, the rendezvous enclave 502 enables each component enclave 520 to be associated with a particular party of multiple parties that have agreed to form the rendezvous enclave 502. Additionally, each party may also provide respective data 530 in encrypted form for processing in the enclave 502. The rendezvous enclave 502 implements a straightforward key management and key handling mechanism to establish trust between the enclaves 530 to ensure security is not compromised. The rendezvous enclave 502 also provides for each party to independently remotely verify an attestation statement that depicts the state of the enclaves where their sensitive tasks being performed. The rendezvous enclave also, in some implementations, allows for quorum voting by use of the split keys to decide when to launch enclaves' execution and when to retire their execution, or perform other necessary enclave management tasks using the split key technique.

Figure 6:
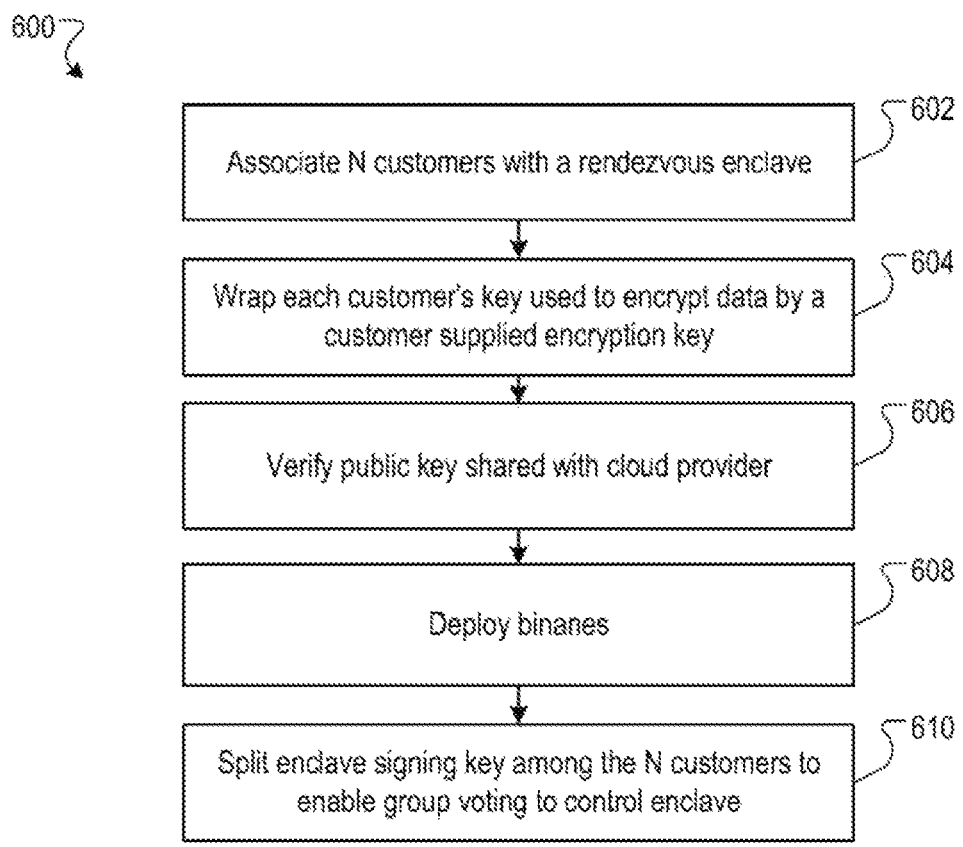
FIG. 6 is a flow diagram of an example process for generating a rendezvous enclave.

FIG. 6 is a flow diagram of an example process for generating a rendezvous enclave. The process 600 associates N customers with a rendezvous enclave (602). For example, assume multiple organizations agree to provide their confidential input to the cloud provider without revealing their data with the goal to compute their common algorithm on the combined data inputs and share the results. Each customer out of N group sign up for enclave management service from a public cloud provider, selects the task to provision cloud enclave pod (e.g., component enclave pods 520 for that customer), and specifies how the enclaves are to be managed, the configuration properties, etc.

As a result of this operation, every customer triggers creation of a respective manifest that describes the configuration of the enclaves pod they would like to deploy, a project identifier and storage bucket(s) identifier, and a set of encryption and signing keys associated with this enclave pod. The manifest is signed with the customer's private key that they shared offline with the cloud key management service.

The process 600 wraps each customer's key used to encrypt data by a customer supplied encryption key (604). Data in the cloud storage bucket is encrypted with the cloud KMS generated key that is wrapped by the customer supplied encryption key (KEK) to ensure that data cannot be accessed unencrypted without the owner's consent.

The process 600 verifies the public key shared with cloud provider (606). The public key that was shared offline with cloud provider is validated as well to ensure that a verifiable customer account is used to create enclave pod.

The process 600 deploys binaries (608). For example, customers specify the binaries they need to deploy into the enclave and specify the locations of the binaries.

The process 600 splits enclave signing key among the N customers to enable group voting to control enclave (610). For shared responsibility enclaves, a cloud key management system generates the enclave signing key and, using a key splitting technique, provides all N participants a respective portion or fragment of the entire key. The key splitting technique enables the participants to vote on the access to the rendezvous enclave pod 502 and allow them to control as a group the enclave use of their respective data from their storage bucket for the algorithm computation.

A cloud key management service split of a signing enclave private key into a N-of-N quorum fragments. For each customer, its respective nth fragment of the key is associated with a project ID of the customer and wrapped by the customer's supplied encryption key KEK. When customers agreed to start the process in the rendezvous enclave, they will use their nth fragment to sign the enclave manifest 512 and share the partially signed message with the cloud enclave management system. Since nothing in the resulting signature is revealing who is "voted", only after all N participants signed their challenges with their nth fragment of the key, the master key associated with the binary and enclave can be reconstructed and enclave can be launched. Thus, by signing the enclave manifest, all participants are agreeing to use their storage buckets as input into enclave computation. The same "voting" process can be applied when the enclave has to be retired or available for attestation, or results of computation made available for everyone. Only when N out of N customers "voted" to launch enclave with their portions of the keys, the enclave can be launched by the cloud and access the data shared by N customers.

In some implementations, every customer from the group can periodically run attestation of enclaves used in the collaborative matter after "voting" agree to enable this capability on the enclave pod 502. As a result, all of the customer can obtain an integrity claim with the enclave measurements to be able to validate the integrity of the code and data that runs in the enclaves.

In some implementations, this capability may work based on a majority voting algorithm of the participants. In other implementations, a split and delegate model can be used when it is sufficient to use only M out of N split key fragments to regenerate the entire key to use it for the authorization of the main critical operation with enclaves, such as launching, retiring, and attestation.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for creating a secure execution environment, comprising:
   receiving a request to create a master enclave, the master enclave being associated with a private key of a customer and a public key of the customer;
   instantiating the master enclave, as part of a public cloud service, such that it includes code and data provided by the customer;
   distributing the code and data to one or more member enclaves according to a master manifest associated with the master enclave; and
   operating the one or more member enclaves such that a first member enclave of the one or more member enclaves uses the public key to validate that a transaction is associated with the master enclave and that the master enclave is signed using the private key.

2. The method of claim 1, comprising creating the master enclave in an on-premises or private cloud environment.

3. The method of claim 1, wherein receiving comprises receiving an upload of the master enclave that is signed with the private key of the customer.

4. The method of claim 3, wherein the master enclave is empty.

5. The method of claim 4, wherein empty comprises the master enclave having no code and no data.

6. The method of claim 1, wherein receiving comprises receiving the public key via another secure channel than a channel over which the private key of the customer is received.

7. The method of claim 1, wherein the master manifest specifies parameters comprising a member enclave location, a hierarchical relationship between the one or more member enclaves, or an availability of the one or more member enclaves.

8. The method of claim 7, wherein distributing comprises distributing the code and data to the one or more member enclaves according to one or more of the parameters.

9. A system, comprising:
   a plurality of computing devices in communication with each other;
   a non-transitory computer readable medium storing instructions executable by the plurality of computing devices, the instructions causing the plurality of computing devices to perform operations comprising:
      receiving a request to create a master enclave, the master enclave being associated with a private key of a customer and a public key of the customer;
      instantiating the master enclave, as part of a public cloud service, such that it includes code and data provided by the customer;
      distributing the code and data to one or more member enclaves according to a master manifest associated with the master enclave; and
      operating the one or more member enclaves such that a first member enclave of the one or more member enclaves uses the public key to validate that a transaction is associated with the master enclave and that the master enclave is signed using the private key.

10. The system of claim 9, comprising creating the master enclave in an on-premises or private cloud environment.

11. The system of claim 9, wherein receiving comprises receiving an upload of the master enclave that is signed with the private key of the customer.

12. The system of claim 11, wherein the master enclave is empty.

13. The system of claim 12, wherein empty comprises the master enclave having no code and no data.

14. The system of claim 9, wherein receiving comprises receiving the public key via another secure channel than a channel over which the private key of the customer is received.

15. The system of claim 9, wherein the master manifest specifies parameters comprising a member enclave location, a hierarchical relationship between the one or more member enclaves, or an availability of the one or more member enclaves.

16. The system of claim 15, wherein distributing comprises distributing the code and data to the one or more member enclaves according to one or more of the parameters.

* * * * *